April 13, 1948. M. F. A. JULIEN 2,439,659
VEHICLE CHASSIS BRACKET STRUCTURE AND WHEEL
SUSPENSION AND ENGINE CONNECTIONS THERETO
Filed March 6, 1945 2 Sheets-Sheet 1

INVENTOR
Maurice Francois Alexandre Julien
BY
ATTORNEY

April 13, 1948. M. F. A. JULIEN 2,439,659
VEHICLE CHASSIS BRACKET STRUCTURE AND WHEEL
SUSPENSION AND ENGINE CONNECTIONS THERETO
Filed March 6, 1945 2 Sheets-Sheet 2
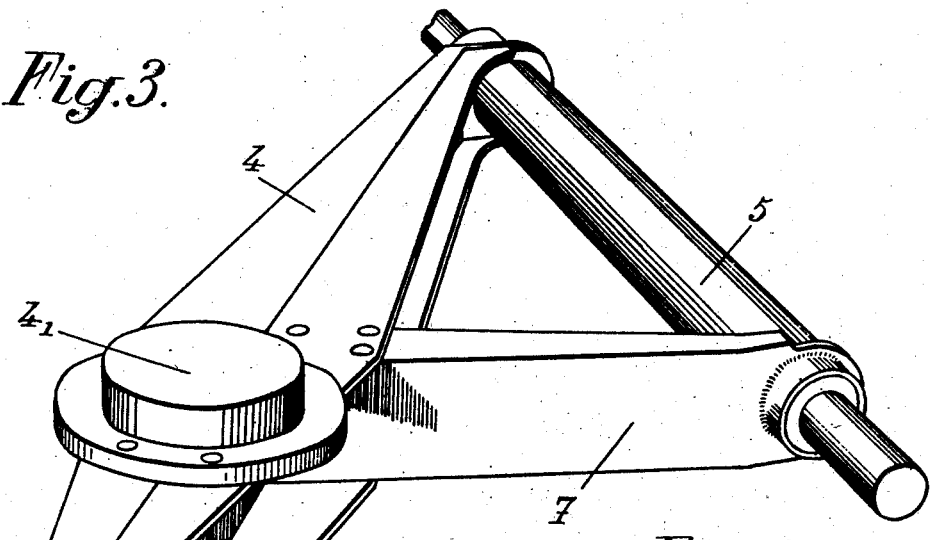
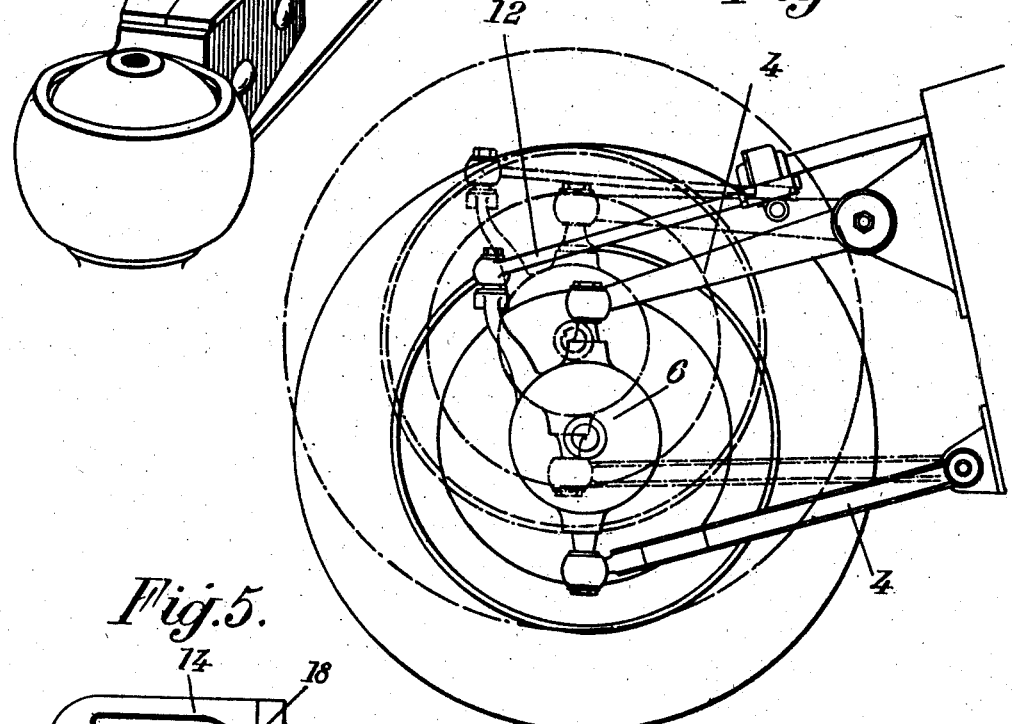
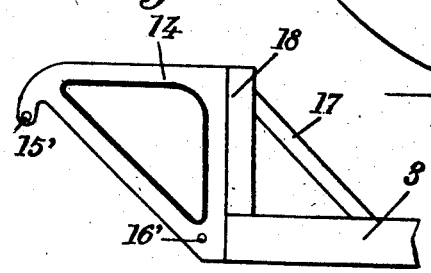

Patented Apr. 13, 1948

2,439,659

UNITED STATES PATENT OFFICE 2,439,659

VEHICLE CHASSIS BRACKET STRUCTURE AND WHEEL SUSPENSION AND ENGINE CONNECTIONS THERETO

Maurice François Alexandre Julien, Toulouse, France

Application March 6, 1945, Serial No. 581,321
In France November 22, 1944

12 Claims. (Cl. 180—43)

The present invention relates to automobile vehicles (intended to run either on roads or on railway tracks).

The object of the present invention is to provide a vehicle of this type which is better adapted to meet the requirements of practice than those made up to the present time, especially concerning reduction of weight, facility of assembling the parts or taking the vehicle to pieces, mechanical resistance and running qualities especially with respect to adhesion to the road surface.

Other objects of my invention will result from the following detailed description of some specific embodiments thereof.

Preferred embodiments of the present invention will be hereinafter described, with reference to the accompanying drawings, given merely by way of example, and in which:

Fig. 3 shows, on an enlarged scale, and in perspective view, some elements of the combination above mentioned;

Fig. 4 is a diagrammatic elevational view of a combination of the same kind made according to another embodiment of the invention;

Fig. 5 is an elevational view of some elements of said combination, according to still another embodiment.

In the following description, it will be supposed that the invention is applied to the case of a vehicle the front wheels of which are both driving wheels and steering wheels. But it should be well understood that the description given with reference to this embodiment has no limitative character.

The chassis-frame of the vehicle includes, in the portion thereof adjacent to the pair of wheels to be assembled with said chassis-frame through the suspension, and preferably inside the wheelbase, a strong transverse member or structure which supports the suspension means. Advantageously, this suspension is of the type including longitudinal arms oscillating about axes parallel to said transverse member.

Figure 1:
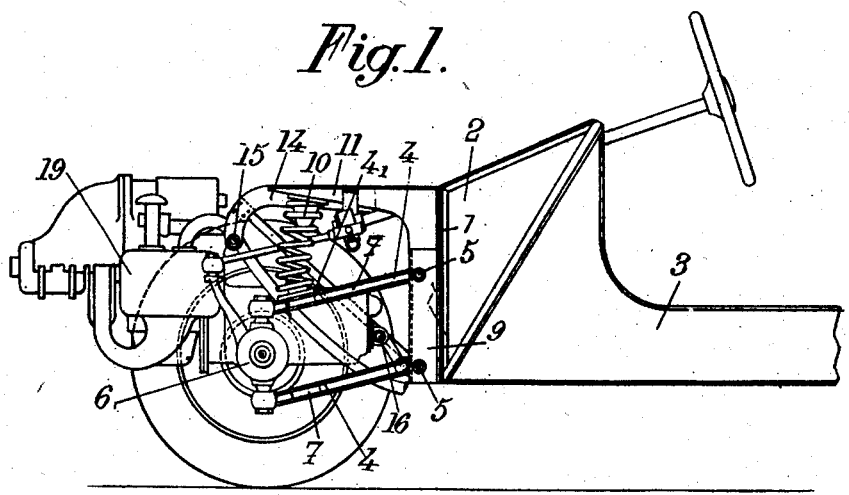
Fig. 1 is an elevational view of the combination of a vehicle chassis-frame with the front wheels, the engine, and the suspension, according to an embodiment of the present invention.
Figure 2:
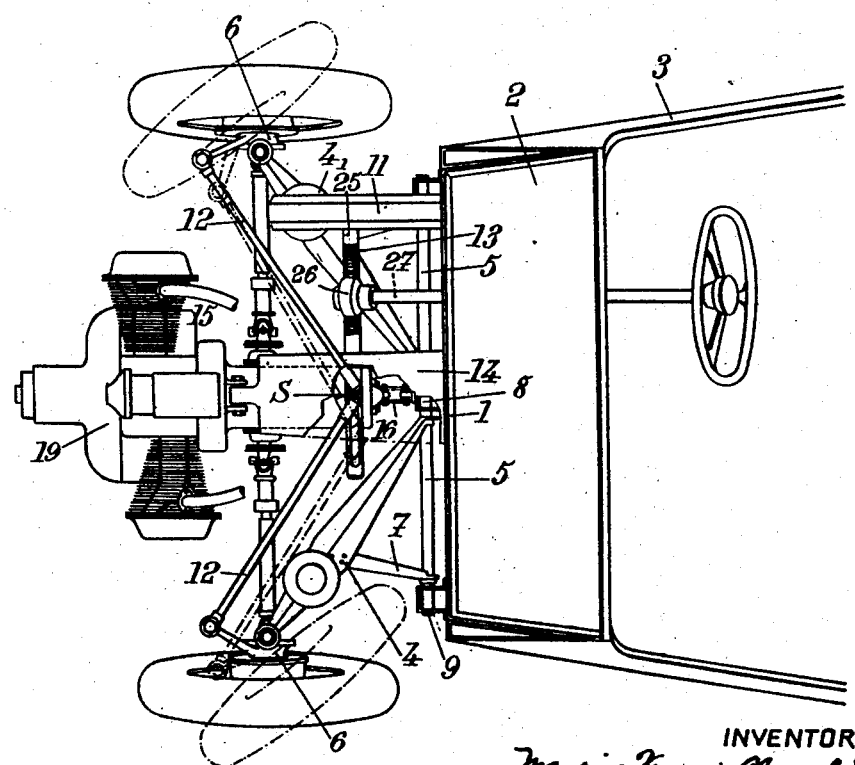
Fig. 2 is a plan view corresponding to Fig. 1.

For this purpose, I may proceed in various ways, for instance as follows:

Concerning first the transverse structure which supports the suspension, it may be made as shown by:

Figs. 1 and 2 of the drawings, including a wall 1 belonging to a stiffening pyramid 2 mounted at the front part of chassis-frame 3.

Under the above arrangement, the end portion of the chassis that adjoins the pair of wheels that is being considered is constituted by said transverse structure, thus leaving available space either at the front or at the rear thereof according as the wheels that are considered are the front wheels or the rear wheels. Such an arrangement permits an easy fitting of the suspension and of the other devices or parts to be provided, such in particular as the motor plant and the steering gear.

Advantageously, the suspension system includes at least two arms 4 either parallel and equal to each other (Figs. 1 and 2) or substantially parallel to each other but of different respective lengths (Fig. 4). These arms 4 are, at one end, pivoted to transverse part 1 about spindles 5 and, at the other end, connected to parts carried by the wheels, respectively, and which may consist of the stub axles 6 of said wheels.

According to another feature of the present invention, it is advantageous to arrange the arm system corresponding to each wheel in such manner that the reactions from the wheel are transmitted to more than one point of spindle 5 and of member 1, and this especially with a view to limiting the local stresses applied to said member 1, in particular when the vehicle wheels are slipping on the ground.

For instance, according to the embodiment illustrated by the drawing, each arm 4 is oblique to cross member 1, said arm being pivoted to the middle part of said member 1 (that is to say close to the longitudinal middle plane of the chassis), and being combined with a strut 7 which is also pivoted to member 1, but near an end part thereof. The whole thus forms a kind of triangle one of the sides of which is constituted by a portion of spindle 5, said spindle being supported at its ends by bearings 8 and 9 removably mounted on transverse structure 1.

Advantageously, each arm 4 is constituted by two sectional irons, of U-shaped section, fixed to each other in opposition along their bottoms, and of variable profile, as shown by Fig. 3.

The whole is of course completed by the suspension elastic means, and, preferably the loads supported by said means are transmitted, either directly or indirectly to the cross member. For instance, if the suspension means in question consist of springs 10, these springs are interposed between arms 4, at $4_1$ (Fig. 3), and brackets 11 rigid with transverse member 1.

It will be readily understood that, in all cases, such a suspension not only is very easy to mount since the whole is fixed to the side face of a transverse member within easy reach, but also has a particularly high mechanical resistance. In particular, when the wheels of the vehicle tend to slip on the road surface, the stresses transmitted to spindles 5 by the two arms 4 that correspond respectively to the two wheels of the pair that is being considered, are of opposed directions and tend to eliminate each other, so that said spindles, and consequently the transverse member 1, are not subjected to any dangerous stress.

Concerning now the steering gear to be used in connection with the steering swivelled wheels of a system such as above described (when said wheels are steering wheels), it is preferably, according to a feature of the present invention, made in such manner that the rods that control the rotations of stub axles 6 remain substantially parallel to arms 4 on the like or to the plane of articulation thereof.

This result can be obtained, in particular, by making use of a central gear control acting symmetrically, or substantially so, on the two wheels, and constituted for instance by two rods 12, making together a V the branches of which are substantially parallel to those of the V formed by arms 4.

It will be seen that, if the apex S (Fig. 2) formed by rods 12 is moved for instance along a straight line parallel to spindles 5, or along any other suitable path of travel, the steering displacements of the wheels can be obtained without substantially destroying the parallelism between elements 12 and 4, respectively (see the dotted lines in Figs. 2 and 4). Accordingly, the steering gear operation is practically uninfluenced by vertical displacements of the suspension.

In order to control the displacements of S, I make use, for instance, of a rack 13 slidably mounted on a member 25 carried by the chassis and meshing with a pinion housed in a casing 26 and keyed on the steering shaft 27, but any other equivalent means may of course be employed within the scope of my invention. It will be observed that the steering rods 12, 12 are each connected with the rack 13 by individual universal joints, affording maintenance of the apex of the stated V connection at a fixed distance from the spindle 5.

Concerning now the fixation of the power plant, it is preferably devised in such manner that the engine and its accessories are supported, in an easily removable way, by transverse member 1. For instance, as shown by the drawing, the engine 19 is supported by a bracket 14, the fixation being effected in at least two points, along axes 15 and 16.

It results from the drawings that the V arrangement of arms 4 and steering gear rods 12 is advantageous since a large space is left available inside the V, so that the power plant, shown at 19, can be fitted in this space.

Fig. 5 illustrates by way of example the case in which the chassis-frame 3, instead of including at the front a wall such as 1 (Figs. 1 and 2), is of conventional construction. In this case bracket 14 is connected to said chassis frame through reinforcing elements such as 17, 18, the power plant being supported at the pivotal connections 15' and 16'.

In all cases, whatever be the particular embodiment that is chosen, I obtain, according to my invention, a combination the working of which results sufficiently clearly from the preceding explanations for making it unnecessary to enter into further description.

This arrangement has, over those used in vehicles as made up to the present time, many advantages among which the following may be cited as particularly interesting:

It is very easy to manufacture.

Its fixation and removal are easy, all the elements being fixed on the outer face of the above mentioned transverse member.

It is easy to remove the engine independently of the steering gear.

The system is very rigid, since all the stresses (especially those resulting from the operation of the suspension device and those produced when the wheels slip on the road surface) are transferred to a resistant portion of the chassis-frame.

The wheels are moved in the vertical direction parallelly without variation of their mutual distance.

The steering gear works in an accurate manner since it is not influenced by the working of the suspension.

There are no braking reactions, since these reactions are taken up by the arms of the parallelograms or equivalent systems.

A high safety is obtained, due to the fact that the suspension and steering elements are on the inside with respect to the plane of the axle (which is true as well in the case of a suspension device for rear wheels as in that of a suspension device for front wheels).

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An automobile vehicle which comprises, in combination, a chassis including a self-stiffened cross member, a plurality of wheels including right and left wheels of a pair of wheels, said cross member of said chassis located inside the wheel-base of said vehicle, and suspension means interposed between each of the wheels of said pair and said chassis, said suspension means including at least one transverse spindle carried by said cross member located on the same side thereof as said wheels, at least one oscillating arm pivoted at one end to said cross member about said spindle and carrying the wheel in question at the other end, and means for elastically opposing upward displacements of said arm, the two arms in question forming a V the apex of which is located in the longitudinal middle plane of said chassis.

2. An automobile vehicle which comprises, in combination, a chassis including a self-stiffened cross member, a plurality of wheels including right and left wheels of a pair of wheels, said cross member of said chassis located inside the wheel-base of said vehicle, and suspension means interposed between each of the wheels of said pair and said chassis, said suspension means including at least one transverse spindle carried by said cross member located on the same side thereof as said wheels, at least one oscillating arm pivoted at one end to said cross member about said spindle and carrying the wheel in question at the other end, and means for elastically opposing upward displacements of said arm, the two arms in question forming a V the apex of which is located in the longitudinal middle plane of said chassis on said cross member.

3. An automobile vehicle which comprises, in combination, a chassis including a self-stiffened cross member, a plurality of wheels including right and left wheels of a pair of wheels, said cross member of said chassis located inside the wheel-base of said vehicle, and suspension means interposed between each of the wheels of said pair and said chassis, said suspension means including at least one transverse spindle carried by said cross member located on the same side thereof as said wheels, at least one oscillating arm pivoted at one end to said cross member about said spindle and carrying the wheel in question at the other end, and elastic means interposed between said arm and said chassis, the two arms in question forming a V the apex of which is located in the longitudinal middle plane of said chassis.

4. An automobile vehicle which comprises, in combination, a chassis including a self-stiffened cross member, a plurality of wheels including right and left wheels of a pair, a stub axle for each of the wheels of said pair, said cross member of said chassis located inside the wheel-base of said vehicle, and suspension means interposed between each of the wheels of said pair and said chassis, said suspension means including two parallel transverse spindles carried by said cross member located one above the other on the same side of said cross member as said wheels, two pairs of oscillating arms located one above the other in the same vertical plane, each of said arms being pivoted at one end to said cross member about one of said spindles respectively, and at the other end to the stub axle of the corresponding wheel, and elastic means interposed between one of the arms of said pair and said chassis for yieldingly opposing upward movements of said last mentioned arm, the two pairs of arms in question being located in vertical planes forming in horizontal projection a V the apex of which is located in the longitudinal middle plane of said chassis.

5. An automobile vehicle which comprises, in combination, a chassis including a self-stiffened cross member, a plurality of wheels including right and left wheels of a pair, a stub axle for each of the wheels of said pair, said cross member of said chassis located inside the wheel-base of said vehicle, and suspension means interposed between each of the wheels of said pair and said chassis, said suspension means including two parallel transverse spindles carried by said cross member located one above the other on the same side of said cross member as said wheels, two pairs of oscillating arms located one above the other in the same vertical plane, each of said arms being pivoted at one end to said cross member about one of said spindles respectively, and at the other end to the stub axle of the corresponding wheel, elastic means interposed between one of the arms of said pair and said chassis for yieldingly opposing upward movements of said last mentioned arm, the two pairs of arms being located in vertical planes forming in horizontal projection a V the apex of which is located in the longitudinal middle plane of said chassis and an auxiliary arm fixed at one end to each of said arms obliquely thereto and pivoted at the other end to the corresponding spindle near one end thereof.

6. An automobile vehicle which comprises, in combination, a chassis, a plurality of wheels including right and left wheels of a pair of steering swivelled wheels, a cross member belonging to said chassis located inside the wheel-base of said vehicle, and suspension means interposed between each of the wheels of said pair and said chassis, said suspension means including at least one transverse spindle carried by said cross member located on the same side thereof as said wheels, a pair of oscillating arms each pivoted at one end to said cross member about said spindle, and carrying the wheel in question at the other end, and means for elastically opposing upward displacements of said arm, the two arms in question forming a V the apex of which is located in the longitudinal middle plane of said chassis, and a steering gear for said pair of wheels including two rods, respectively connected with said wheels, forming a V substantially parallel to the first mentioned V in intermediate position, and steering control means for displacing the apex of said second mentioned V in the transverse direction.

7. An automobile vehicle which comprises, in combination, a chassis including a self-stiffened cross member, a plurality of wheels including right and left wheels of a pair, a swivelled stub axle for each of the wheels of said pair, said cross member of said chassis located inside the wheel-base of said vehicle, suspension means interposed between each of the wheels of said pair and said chassis, said suspension means including two parallel transverse spindles carried by said cross member located one above the other on the same side of said cross member as said wheels, a pair of oscillating arms each located one above the other in the same vertical plane, each of said arms being pivoted at one end to said cross member about one of said spindles respectively, and at the other end to the stub axle of the corresponding wheel, and elastic means interposed between said one of the arms of said pair and said cross member for yieldingly opposing upward displacements of said last mentioned arm, the two pairs of arms in question being located in vertical planes forming in horizontal projection a V the apex of which is located in the longitudinal middle plane of said chassis, and a steering gear for said pair of wheels including two rods, respectively connected with said stub axles and parallel to said arms in the intermediate position of said steering gear, a rack movable in said chassis parallel to said spindles operatively connected to both of said rods, a pinion in mesh with said rack rotatably carried by said chassis and means for rotating said pinion.

8. An automobile vehicle which comprises, in combination, a chassis, a plurality of wheels including right and left wheels of a pair of wheels, a cross member belonging to said chassis located inside the wheel base of said vehicle, two brackets carried by said cross member on either side of the middle plane of symmetry thereof and extending toward the wheels of said pair, and suspension means interposed between each of said wheels and said chassis, said suspension means including at least one transverse spindle carried by said cross member on the same side thereof as said wheels, at least one oscillating arm pivoted at one end to said cross member about said spindle and carrying the wheel at the other end, and a spring interposed between said arm and one of said brackets respectively for elastically opposing upward displacements of said arm, the two arms in question forming a V the apex of which is located in the longitudinal middle plane of said chassis.

9. An automobile vehicle which comprises, in combination, a chassis, a plurality of wheels including right and left wheels of a pair of wheels, a cross member belonging to said chassis located inside the wheel base of said vehicle, suspension means interposed between each of said wheels and said chassis, said suspension means including at least one transverse spindle carried by said cross member on the same side thereof as said wheels, at least one oscillating arm pivoted at one end to said cross member about said spindle and carrying the wheel at the other end, and spring means interposed between said arm and said chassis for elastically opposing upward displacements of said arm, the two arms in question forming a V the apex of which is located in the longitudinal middle plane of said chassis, and an engine for said vehicle carried by said chassis in the opening of said V.

10. An automobile vehicle which comprises, in combination, a chassis, a plurality of wheels including right and left wheels of a pair of wheels, a cross member belonging to said chassis located inside the wheel base of said vehicle, suspension means interposed between each of said wheels and said chassis, said suspension means including at least one transverse spindle carried by said cross member on the same side thereof as said wheels, at least one oscillating arm pivoted at one end to said cross member about said spindle and carrying the wheel at the other end, and spring means interposed between said arm and said chassis for elastically opposing upward displacements of said arm, the two arms in question forming a V the apex of which is located in the longitudinal middle plane of said chassis, a bracket carried by said cross member at the middle part thereof and extending toward said pair of wheels, and an engine for said vehicle carried by said bracket and located in opening of said V.

11. An automobile vehicle which comprises, in combination, a chassis, a plurality of wheels including right and left wheels of a pair of wheels, a cross member belonging to said chassis located inside the wheel base of said vehicle, two brackets carried by said cross member on either side of the middle plane of symmetry thereof and extending toward the wheels of said pair, suspension means interposed between each of said wheels and said chassis, said suspension means including at least one transverse spindle carried by said cross member on the same side thereof as said wheels, at least one oscillating arm pivoted at one end to said cross member about said spindle and carrying the wheel at the other end, and a spring interposed between said arm and one of said brackets respectively for elastically opposing upward displacements of said arm, the two arms in question forming a V the apex of which is located in the longitudinal middle plane of said chassis, a third bracket carried by said cross member at the middle part thereof and extending toward said pair of wheels, and an engine for said vehicle carried by said third bracket and located in opening of said V.

12. An automobile vehicle which comprises, in combination, a chassis including a self-stiffened cross member, a plurality of wheels including right and left wheels of a pair, said cross member of said chassis being located inside the wheel base of said vehicle, a horizontal transverse spindle carried by said cross member on the same side thereof as the wheels of said pair, and suspension means interposed between each of the wheels of said pair and said chassis, each of said suspension means including an oscillating arm pivoted at one end to said cross member about said spindle at the middle part thereof and carrying the wheel in question at the other end, elastic means interposed between said arm and said chassis for yieldingly opposing upward movements of said arm, and an auxiliary arm fixed at one end of said arm obliquely thereto and pivoted at the other end to said cross member about said spindle near one end thereof.

MAURICE FRANÇOIS ALEXANDRE JULIEN.

REFERENCES CITED

The following references are of record in the file of this patent:

UNITED STATES PATENTS

| Number | Name | Date |
|---|---|---|
| 1,711,881 | Fornaca | May 7, 1929 |
| 1,803,055 | Causan | Apr. 28, 1931 |
| 1,903,694 | Burney | Apr. 11, 1933 |
| 1,959,548 | Ries | May 22, 1934 |
| 1,974,036 | Ammen | Sept. 18, 1934 |
| 2,164,470 | Opolo | July 4, 1939 |
| 2,330,633 | Seyerle | Sept. 28, 1943 |
| 2,334,702 | Newton et al. | Nov. 23, 1943 |